Nov. 29, 1932.　　　　R. O. PICKIN　　　1,889,321
PIPE CUTTING TOOL
Filed Dec. 26, 1928

INVENTOR.
Rowland O. Pickin

Patented Nov. 29, 1932

1,889,321

UNITED STATES PATENT OFFICE

ROWLAND O. PICKIN, OF LOS ANGELES, CALIFORNIA

PIPE CUTTING TOOL

Application filed December 26, 1928. Serial No. 328,471.

The invention relates to improvements in pipe cutting tools used for the purpose of cutting pipe in wells drilled by the rotary method of drilling.

The principal object of the invention is to provide a pipe cutting tool that will cut either flush joint drill pipe or drill pipe having couplings, the cut being made from the outside of the pipe.

Another object of the invention is to provide a pipe cutting tool that can be used for washing over the pipe and that can be turned either to the right or the left when being lowered into the well, without releasing or in any way affecting the cutters.

Another object of the invention is to provide a pipe cutting tool in which the cutters are protected against friction and wear when being lowered over the pipe, or when rotating the tool to wash its way down to the cutting position.

Another object of the invention is to provide a pipe cutting tool with cutters that are fed in with a steady and continued pressure and that can be withdrawn from cutting at any time during the cutting operation.

Another object of the invention is to provide a pipe cutting tool that has the feeding pressure on the cutters regulated before the tool is inserted into the well.

Other objects and advantages of the invention will be apparent as it is better understood from the following description when considered in connection with the accompanying drawing illustrating a preferred embodiment thereof.

On the drawing.

Similar numerals refer to similar parts throughout the several views.

Figure 1:
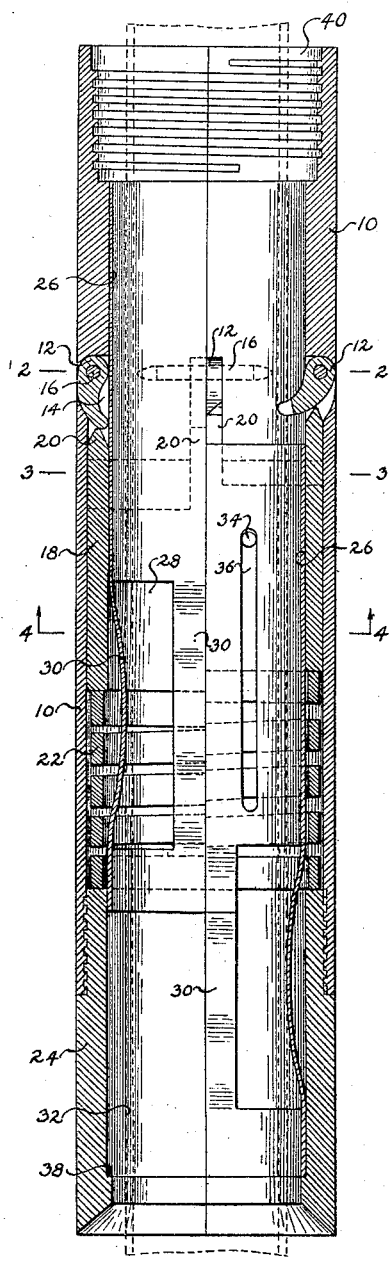
Fig. 1 is a front sectional elevation of the pipe cutting tool, the left half of the section showing the tool before the cutters are released, and the right half showing the tool with the cutters released and in operation.
Figure 2:
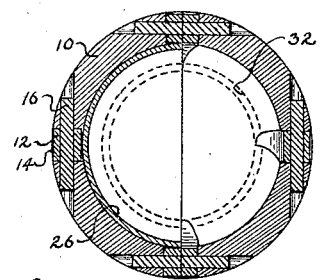
Fig. 2 is a section taken on the line 2—2 of Fig. 1.

The numeral 10, Figs. 1, 2, 3 and 4 indicates the body of the pipe cutting tool. The cutters 12, Figs. 1 and 2 are located in the top heavy section of the body, provision being made for four cutters in the present illustrations. Each cutter is rotatably secured in a groove 14 in the body by a pin 16, a hole being provided in the cutter and the body for the accommodation of the pin, the pin being supported at each end in the body.

Figure 3:
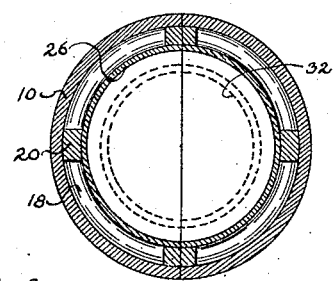
Fig. 3 is a section taken on the line 3—3 of Fig. 1.
Figure 4:
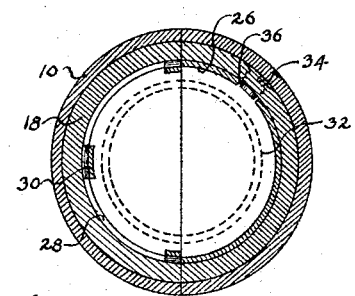
Fig. 4 is a section taken on the line 4—4 of Fig. 1.

Below the cutter 12 is the annular sleeve 18, and upon the upper end of this sleeve are the upwardly projecting lugs 20, Figs. 1 and 3, these upwardly projecting lugs extending into the grooves 14, Figs. 1 and 2, and contacting with the lower inclined portion of the cutters 12, the contact being constantly maintained by the compressed coil spring 22, Fig. 1. The spring is compressed by screwing the shooe 24 into the lower end of the body 10 before the tool is lowered into the well.

To prevent the cutters from coming into contact with the pipe as the tool is lowered into the well, an annular cutter releasing member or sleeve 26, Figs. 1, 2, 3 and 4 is inserted inside the body 10, and extends downwardly through the tool to the shoe 24. The lower end of this member has apertures 28 for the purpose of forming the spring strips 30. The strips 30 are fashioned into elliptical springs for the purpose of making contact with and gripping the pipe, indicated by the dotted lines 32.

Before the coil spring 22 is compressed the cutter releasing member 26 carrying the elliptical spring strips 30 is inserted into place and holds the cutters back in the postion shown on the left hand side of Fig. 1, and is secured against rotation by the threaded stop pin 34 inserted into the sleeve 18 and projecting into the vertical elongated slot 36. The sleeve 18 is secured against rotation by the projecting lugs 20 which always remain in the groove 14 in the body 10. The vertical movement of the member 26 is limited by the shoulder 38 in the shoe 24 and the lower end of the operating member (not shown), which enters the threaded connecting joint 40 at the upper end of the body 10, Fig. 1, in addition to the stop pin 34 in the elongated slot 36.

When the tool is lowered into the well the member 26 is placed in its highest position, and is temporarily held in this position by the cutters which are in forced contact with the member 26, thus preventing the member 26 from sliding down before the tool is lowered over the pipe to be cut.

When the tool runs over the pipe, the elliptical spring strips 30, attached to the cutter releasing member 26 grip the pipe, this again tends to keep the member 26 in its upper position until the tool has reached the location where it is desired to sever the pipe, the tool is then raised and the cutter releasing member gripping the pipe remains with the pipe and the remainder of the tool rises up until the cutters rise over the top of the cutter releasing member and are exposed and released and are forced into contact with the pipe, as shown on the right hand side of Figs. 1 and 2.

The tool is then rotated to the right and the cutters cut through the pipe from the outside towards the center.

The tool may then be raised and other cuts made before withdrawing the tool from the well.

I claim:

1. In a pipe cutting tool, a body, a plurality of cutters, each cutter being pivotally secured upon a bearing in said body, an annular cutter operating sleeve, a normally compressed coil spring, a threaded annular spring compressing member, and an annular slidable cutter restraining sleeve for temporarily locking said cutters in in-operative position, and for releasing said cutters into operation, said cutter restraining sleeve being operated by contact with the pipe to be cut.

2. In a pipe cutting tool, a body, a plurality of cutters secured therein, a normally compressed coil spring for forcing said cutters into operation, and a threaded annular spring compressing member, and an annular slidable cutter restraining sleeve for temporarily locking said cutters in in-operative position, and for releasing said cutters into operation, means for securing said cutter restraining sleeve against rotation with respect to the said body whilst the cutters are in operation.

3. In a pipe cutting tool, the combination of a tubular body, a cutter pivotally secured therein, a cutter releasing member having resilient contact with the pipe to be cut, a normally compressed coil spring encircling the pipe to be cut, said spring being for the purpose of forcing said cutter into contact with the pipe to be cut, and for forcing said cutter after being released to cut said pipe upon rotation of the tool.

4. In a tool for cutting pipe and for like purposes, a tubular housing, pipe cutters adapted to rotate with said housing, a cutter restraining sleeve interposed between the cutters and the pipe to be cut, pipe engaging means carried by said sleeve, and adjustable means interengaging said sleeve and a member connected with said housing to control the movement of said housing in relation to said sleeve for releasing the cutters into contact with the pipe upon relative movement of the housing in relation to the sleeve.

5. In a tool for cutting pipe and for like purposes, a housing, a cutter pivotally secured in said housing, an annular cutter actuating member actuated by a normally compressed coil spring compressed between said member and a stationary shoulder attached to said housing, and a cutter restraining sleeve in engagement with the pipe to be cut for temporarily locking said cutter in inoperative position and for releasing said cutter into operation upon movement of said housing in relation to said sleeve.

6. In a tool for cutting pipe and for like purposes, a housing, a plurality of cutters secured therein, a normally compressed coil spring for forcing said cutters into operation, a threaded annular spring compressing member, and an annular slidable cutter restraining sleeve interposed between the cutters and the pipe to be cut for temporarily locking said cutters in in-operative position and for releasing said cutters into operation, and means for securing said cutter restraining sleeve against rotation independent of said housing.

7. In a tool for cutting pipe and for like purposes, the combination of a tubular body, a cutter pivotally secured therein, and a normally compressed coil spring secured in said body for forcing the cutter into contact with the pipe, and a cutter locking sleeve having resilient contact with the pipe removably positioned between the cutter and the pipe to be cut.

8. A tool for cutting pipe and for like purposes, comprising a tubular body, a cutter pivotally mounted in said body in a slot cut longitudinal thereto, an annular cutter feeding member operated by a coil spring encircling the inside of said tubular body, said spring being normally compressed between the feeding member and a fixed shoulder attached to the body before the tool is inserted into the well, the normal expansion of said spring from said fixed shoulder being the sole means of forcing the cutter to cut the pipe upon rotation of the tool.

9. A tool for cutting pipe and for like purposes, comprising a tubular body, a cutter mounted in an axial slot in said body, an annular cutter actuating member contacting with the back of said cutter and having means provided for constantly exerting force upon said cutter to move the cutter inwardly, said means consisting of a normally compressed coil spring which actuates by expansion only, and a sleeve interposable between the cutter and the pipe for temporarily preventing the cutter from moving inwardly from said slot, said sleeve having resilient means attached thereto for anchoring the sleeve to the pipe so that the said body may move independently of said sleeve to release the cutter into contact with the pipe.

10. A tool for cutting pipe and for like purposes, comprising an annular body, a cutter pivotally mounted in a slot, a cutter actuating lug extending into said slot, a normally compressed coil spring for forcing said cutter actuating lug to swing the cutter into cutting position, and a slidable cutter restraining sleeve for temporarily locking said cutter in non-cutting position, said sleeve having resilient contact with the pipe for anchoring the sleeve to the pipe so that the cutter may be released into operating position as the body moves the cutter out of contact with the sleeve.

11. A tool for cutting pipe and for like purposes, comprising a hollow body, cutters pivoted therein, means constantly tending to project the cutters into cutting position, a sleeve interposable between the cutters and the pipe movable into position to maintain them retracted, and means to yieldably anchor said sleeve to the pipe against movement in either direction, and means on said body to limit the motion of said sleeve in relation to the body.

12. A tool for cutting pipe and for like purposes, comprising a tubular body, a pivoted cutter mounted in a slot cut longitudinally in the body, said cutter being swung inwardly into cutting position by an annular member having a lug rigidly attached thereto, said lug extending into said slot and into contact with the cutter, said contact being caused and maintained by a normally compressed coil spring encircling the inside of said body, said spring being compressed between said annular member and a shoulder attached to said body before inserting the tool into the well.

13. A tool for cutting pipe and for like purposes, comprising a tubular body, a pivoted cutter mounted in a slot cut longitudinally in said body, said cutter lying retracted therein in non-cutting position, and an annular cutter feeding member having a rigidly attached upwardly projecting portion for the purpose of projecting into said slot to force said cutter to swing into contact with the pipe, said contact being caused and maintained by a normally compressed coil spring, the spring being compressed between a shoulder attached to said body and said cutter feeding member before inserting the tool into the well.

ROWLAND O. PICKIN.